Patented June 30, 1953

2,643,967

UNITED STATES PATENT OFFICE 2,643,967

CONCENTRATE OF TYROTHRICIN AND ITS THERAPEUTICALLY ACTIVE COMPONENTS

Julius Pfannmuller, North Plainfield, N. J., assignor to Wallerstein Company, Inc., New York, N. Y., a corporation of New York No Drawing. Application August 31, 1946, Serial No. 694,407

2 Claims. (Cl. 167—65)

This invention relates to the production of stable solutions of gramicidin and tyrothricin.

Gramicidin and tyrothricin are substances which posses a high bacteriostatic and bactericidal activity against gram-positive micro-organisms both in vivo and in vitro. These substances are obtained by growing cultures of certain spore-forming bacteria according to known procedures. Tyrothricin has been found to be a mixture consisting principally of two components: tyrocidine hydrochloride and gramicidin. These several substances, in pure form, are crystalline substances. It is believed that gramicidin shows a much higher bacteriostatic and bactericidal activity than does tyrocidine hydrochloride.

In the practical use of gramicidin and tyrothricin as antibiotics, it is desirable to use them in the form of a water, weak alcohol or saline solution. Such use, however, is seriously limited by reason of the fact that the solubility of gramicidin and tyrothricin in water is very low. For example, the solubility of gramicidin in water has been determined to be about 0.4 part per million, or 0.4 microgram per cubic centimeter. In saline solutions the solubility is still further decreased. For instance, in the known process of separating tyrothricin from bacterial cultures, an alcoholic extract is made which contains the active antibiotic substance in solution. From this alcoholic solution the active antibiotic substance can be quantitatively precipitated by adding 10 parts of a 1% sodium chloride solution per 1 part of alcoholic solution. Most of the organic and inorganic salts act as precipitating agents for gramicidin and tyrothricin.

It is an object of the present invention to provide aqueous solutions of gramicidin and tyrothricin that are stable in substantially any desired concentration, even in relatively high concentrations. In this connection, it is to be understood that the word "aqueous" as used here and in the following description and the appended claims, is used in its broad sense, meaning watery. Thus, "aqueous solution" is to be taken as meaning a solution in which the solvent is all or principally water, such as a water solution, a saline solution, or a weak, diluted alcohol solution or the like.

It is a further object of the invention to provide a practicable and effective process for producing such solutions.

Additional objects and advantages of the invention will be apparent from the ensuing description.

I have discovered that stable aqueous solutions of gramicidin and tyrothricin, even in high concentration, can be obtained by the use of certain organic quaternary nitrogen compounds. These compounds belong to the class of organic quaternary bases or their salts and are characterized by the presence of a five-valent nitrogen atom, four of the valences being linked directly with a carbon atom. Such compounds comprise the class of organic quaternary ammonium bases, their derivatives and their salts, together with other organic quaternary bases which may be considered as derivatives of pyridine and their salts.

By combining the gramicidin or tyrothricin with one or more compounds of the class referred to, which compounds serve as what may be termed solubilizing agents, I obtain an aqueous solution that is stable against precipitation of the antibiotic in substantially all concentrations of the latter.

The desired results may be obtained, at least in kind, by the use of even the most simple representatives of the group referred to, for example, tetramethylammonium hydroxide.

In carrying out the invention to what is now considered the best advantage, however, I select a member of the class above recited in which one or more of the simple alkyl groups or substituted alkyl group is replaced on the nitrogen by a longer alkyl chain. For example, I have found that if one methyl group of tetramethylammonium bromide is replaced by a cetyl group (cetyl trimethyl ammonium bromide), the solubilizing action is very substantially increased.

In the selection of the solubilizing substances suitable for carrying out the invention, it is not necessary that all groups linked with the nitrogen atom be aliphatic. The aliphatic groups may be replaced by aromatic groups, for example, benzyl groups, etc., or the nitrogen may be linked in a heterocyclic ring, as for instance, in the quaternary pyridinium or isoquinolinium bases.

In carrying out the invention, the organic quaternary nitrogen compound may be combined with the gramicidin or tyrothricin in any suitable manner. For example, the desired aqueous solution may be obtained simply by mixing the gramicidin or the tyrothricin with a more or less concentrated solution of the solubilizer and then diluting with water or saline solution.

I have found, however, that particularly favorable results are obtained by dissolving the antibotic in any agent in which the solubilizer is also soluble or by dissolving the antibiotic in a suitable solvent and then adding a more or less concentrated aqueous solution of the solubilizer. For the purpose mentioned, all water-soluble organic solvents which dissolve gramicidin and tyrothricin, such as methanol, ethanol, poly alcohols, glycerin, ethyl lactate, etc., are suitable.

If desired, more than one of the cited nitrogen compounds may be used.

In the manner described, strong solutions of the active antibiotic may be prepared and these solutions may then be diluted with water, saline solutions, or other salt solutions, to any desired strength without precipitation of the gramicidin or tyrothricin. That is, the result of the procedure described is a stable aqueous solution in substantially any concentration.

Instead of diluting, the organic solvent may be evaporated out and the resulting dry product may then be solubilized with water as desired.

While the amount of the organic quaternary nitrogen compound used may vary within a considerable range, generally speaking only relatively small amounts are required to obtain the desired results. For example, in the case of gramicidin a satisfactory range is to 1 to 10 parts of the solubilizing compound to 1 part gramicidin. More specific examples are hereinafter set forth.

It is to be understood that the words "combining" and "combination," as used in the specification and claims hereof, are used broadly, in the sense of bringing together or mixing, and do not necessarily imply any particular type of chemical reaction. It is also to be understood that the term "solution" is used in a broad sense and does not necessarily imply any homogenous solution in the strict sense.

The following more specific procedures under the invention are cited by way of example. In each case the result is a stable solution with the absence of any precipitation of the antibiotic. In each case the gramicidin or tyrothricin, as the case may be, displays the normally expected antibiotic activity. In most of the examples, the resulting solution is marked by brilliancy.

*Example 1*

Dissolve 5 grams of tetramethylammonium hydroxide and 2.5 grams of tyrothricin to one-hundred milliliters with 95% ethanol. A slight warming is advantageous. The resulting alcoholic solution, containing 25,000 micrograms of tyrothricin per cubic centimeter, may then be diluted with water or a normal saline solution to any desired concentration of tyrothricin, even down to about 10 micrograms per cc.

*Example 2*

Dissolve 0.75 gram pure gramicidin and 5 grams of cetyl trimethyl ammonium bromide in one-hundred milliliters of 95% ethanol. The resulting solution, containing 7500 micrograms of gramicidin per cc., is stable and may be diluted down to any desired concentration of gramicidin with physiological saline solution. By comparison, a solution containing the same amount of gramicidin but no cetyl trimethyl ammonium bromide precipitates quantitatively upon addition of 10 parts saline solution to 1 part alcoholic solution.

*Example 3*

Prepare an aqueous solution containing 0.04% lauryl trimethyl ammonium bromide. Add 0.5% of alcoholic extract containing 40,000 micrograms per cc. of tyrothricin. The resulting stable solution contains 200 micrograms of tyrothricin per cc.

*Example 4*

Prepare a solution containing 1% gramicidin dissolved in propylene glycol and an aqueous solution containing 5% octadecyl dimethyl ethyl ammonium bromide. Mix equal parts of these two solutions and dilute with the same amount of water. The resulting mixture, containing 2500 micrograms of gramicidin per cc., may be diluted with any desired amount of a 1% sodium sulfate solution or a 1% saline solution.

*Example 5*

Dissolve 3.75 parts, by weight, of pure gramicidin and 29.5 parts, by weight, of cetyl dimethyl ethyl ammonium bromide in 100 parts of ethyl lactate. Dilute 1 part of this solution to 100 with water. The resulting stable solution contains 375 micrograms of gramicidin per cc.

*Example 6*

Prepare an 0.04% aqueous solution of octadecyl dimethyl benzyl ammonium chloride. To 100 parts of this solution add 1 part of a 1% ethanol solution of gramicidin. The resulting stable solution contains 100 micrograms of gramicidin per cc.

*Example 7*

Prepare an aqueous solution containing 0.04% of the compound marketed under the trade name "Emulsept" being the lauric acid ester of N-(colamino formyl-methyl) pyridinium chloride

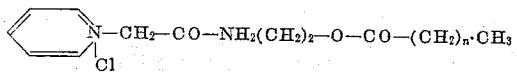

(Albert K. Epstein et al., "The Detergent Properties of Bactericidal Fatty Acid Derivatives," Oil and Soap, 20, 171–4, 1943, and V. J. Penniston et al., "The Germicidal Efficiency of Emulsept and of Chlorine in Washing Dirty Eggs," Science 101, 362–3, 1945). Adjust the pH to about 7. To 100 parts of this solution add 0.5 part of an alcoholic solution in which 4% tyrothricin has been dissolved. The resulting stable solution contains 200 micrograms of tyrothricin per cc.

*Example 8*

In 80 parts of methyl alcohol, dissolve 0.75 part of pure gramicidin and 5 parts of p-tertiary octyl phenoxy ethoxy ethyl dimethyl benzyl ammonium chloride monohydrate. Remove the methyl alcohol by evaporation. The resulting dry product can be solubilized with water to obtain stable solutions of gramicidin of high concentration.

I claim:

1. A clear, essentially aqueous antibiotic concentrate comprising an antibiotic selected from the class consisting of tyrothricin and one of its therapeutically active components and as a solubilizer therefor a water-soluble salt of a pyridinium quaternary compound having one long chain aliphatic group containing a long chain alkyl group attached directly to the pyridinium nitrogen atom; said concentrate yielding on dilution with an aqueous solvent a clear, stable solution containing the antibiotic in a concentration greater than its solubility in an otherwise identical solution not containing the solubilizer, said concentration being sufficient to manifest antibiotic activity.

2. A clear, essentially aqueous antibiotic concentrate comprising an antibiotic selected from the class consisting of tyrothricin and one of its therapeutically active components and as a solubilizer therefor the lauric acid ester of N-(col-amino formyl-methyl)pyridinium chloride, said concentrate yielding on dilution with an aqueous solvent a clear, stable solution containing the antibiotic in a concentration greater than its solubility in an otherwise identical solution not containing the solubilizer, said concentration being sufficient to manifest antibiotic activity.

JULIUS PFANNMULLER.

References Cited in the file of this patent

UNITED STATES PATENTS

| Number | Name | Date |
|---|---|---|
| 2,264,150 | Hueter | Nov. 25, 1941 |
| 2,309,592 | Hueter | Jan. 26, 1943 |

OTHER REFERENCES

Transactions Amer. Acad. Ophth. & Laryng., August 1943, page 433.

Journal of Bacteriology, May 1944, page 427.